(12) United States Patent  
Manouvrier

(10) Patent No.: US 9,104,047 B2  
(45) Date of Patent: Aug. 11, 2015

(54) ELECTRO-OPTICAL PHASE SHIFTER HAVING A LOW ABSORPTION COEFFICIENT

(71) Applicant: STMICROELECTRONICS SA, Montrouge (FR)

(72) Inventor: Jean-Robert Manouvrier, Echirolles (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 14/263,068

(22) Filed: Apr. 28, 2014

(65) Prior Publication Data

US 2014/0376852 A1    Dec. 25, 2014

(30) Foreign Application Priority Data

May 7, 2013    (FR) ...................................... 13 54206

(51) Int. Cl.
*G02F 1/01*    (2006.01)
*G02F 1/025*    (2006.01)

(52) U.S. Cl.
CPC ...................................... *G02F 1/025* (2013.01)

(58) Field of Classification Search
CPC ...................................................... G02F 1/025

USPC .................................... 385/1–3, 14, 129–132
See application file for complete search history.

(56) References Cited

U.S. PATENT DOCUMENTS

| 6,298,177 | B1 * | 10/2001 | House ................................. 385/3 |
| 2008/0159680 | A1 * | 7/2008 | Gill .................................... 385/3 |
| 2008/0212913 | A1 | 9/2008 | Gill et al. |
| 2012/0063714 | A1 | 3/2012 | Park et al. |

OTHER PUBLICATIONS

Hazura et al., "An Analysis of Silicon Waveguide Phase Modulation Efficiency Based on Carrier Depletion Effect," International Conference on Semiconductor Electronics, Piscataway, NJ, Jun. 28, 2010, pp. 349-350.

* cited by examiner

*Primary Examiner* — Ryan Lepisto
(74) *Attorney, Agent, or Firm* — Allen, Dyer, Doppelt, Milbrath & Gilchrist, P.A.

(57) ABSTRACT

A semiconductor electro-optical phase shifter may include a central zone configured to be placed in an optical waveguide and doped at a first conductivity type, a first lateral zone adjacent a first face of the central region and doped at a second conductivity type, and a second lateral zone adjacent a second face of the central zone and doped at the second conductivity type.

11 Claims, 2 Drawing Sheets

(Prior Art)

ELECTRO-OPTICAL PHASE SHIFTER HAVING A LOW ABSORPTION COEFFICIENT

TECHNICAL FIELD

The present disclosure relates to optical modulators, and in particular, to electro-optical phase shifters used in such modulators.

BACKGROUND

FIG. 1 shows an optical modulator that is based upon the principle of the Mach-Zehnder interferometer, commonly referred to as a MZI modulator. The modulator comprises an optical waveguide receiving a power P, which is divided into two branches at a point S. The two branches join again at a point J, one directly and the other via an electro-optical phase shifter 10. Each branch carries half of the original optical power. An optical wave may be phase-shifted, because it acts as a carrier of frequency f=c/λ, where c is the speed of light, and λ the wavelength. The carriers arriving via the two branches are added at point J of the modulator, one having been shifted by φ by phase shifter 10. The resulting carrier has a power of P·cos 2(φ/2), neglecting the optical losses.

FIG. 2 shows a perspective view of a phase shifter 10 inserted between two aligned sections of an optical waveguide 12. As shown, the waveguide has an inverted "T" cross-section, the central part of which carries the optical beam. The phase shifter 10 is configured to connect to the sections of the waveguide, and it also has an inverted "T" cross-section. In addition, the edges of the phase shifter ascend above the plane of the waveguide; these edges bear electrical contacts (not shown) for controlling the phase shifter.

FIG. 3 is a so-called High-Speed Phase Modulator (HSPM) phase shifter 10. In this cross-section view, the section plane is perpendicular to the axis of the optical waveguide. A dashed line circle, at the thicker portion of the central zone, represents the portion of the waveguide crossed by the optical beam. The phase shifter comprises a semiconductor structure, typically silicon, forming a P—N junction 14 in a plane parallel to the axis of the waveguide, and offset relative thereto. The junction 14 is shown, for example, at the right side face of the waveguide. A P-doped region extends to the left of junction 14, and has a cross section conforming to the cross section of the waveguide, namely elevated in the center and lower at the edge. Zone P ends at its left by a P+ doped raised region, bearing an anode contact A.

An N-doped region extends to the right of junction 14 and conforms to the cross-section of the waveguide. Zone N ends at its right by an N+ doped raised area, bearing a cathode contact C. The structure of the phase shifter may be formed on an insulating substrate, for example, a buried oxide BOX.

For controlling the phase shifter of FIG. 3, a voltage is applied between the anode and cathode contacts A, C, which reverse biases the junction 14 (the '+' on the cathode and the '−' on the anode). This configuration causes a displacement of electrons e from the N region to the cathode and of holes h from the P region to the anode, and the creation of a depletion region D in the vicinity of the junction 14. The carrier concentration is thus modified in accordance with the magnitude of the bias voltage, in the area crossed by the optical beam, which results in a corresponding modification of the refractive index of this area. The sensitivity of an electro-optical phase shifter is expressed in degrees per volt per unit of length of the phase shifter. The sensitivity of the phase shifter to changes in the control voltage increases with its length, but the absorption coefficient, i.e. the optical losses, also increases with the phase shifter's length.

SUMMARY

Generally, a semiconductor electro-optical phase shifter may comprise a central zone configured to be disposed in an optical waveguide and doped at a first conductivity type, and a first lateral zone adjacent a first face of the central region and doped at a second conductivity type. The first face may form a first P-N junction. The semiconductor electro-optical phase shifter may comprise a second lateral zone adjacent a second face of the central zone and doped at the second conductivity type, whereby the second face forms a second P—N junction.

According to an embodiment, the phase shifter may comprise two electrical terminals in contact respectively with the first and second lateral zones. Also, the doping of the central zone may be at a minimum level, and the doping level of each lateral zone may increase going from the central zone to the respective control terminal.

According to another embodiment, the phase shifter may comprise a structure configured to make electrical contact with the central zone. Further, the electrical contact structure may comprise, in a plane parallel to that of the first and second lateral zones, a third lateral zone adjacent the first face of the central zone and doped at the first conductivity type, a fourth lateral zone adjacent the second face of the central zone and doped at the first conductivity type, and two electric contacts arranged respectively on the third and fourth lateral zones.

Moreover, in some embodiments, the doping of the central zone may be at a minimum level, and the doping level of each of the third and fourth lateral zones may increase going from the central zone towards the respective electrical contact. Additionally, the phase shifter may comprise pairs of third and fourth lateral zones in several planes interleaved along the axis of the waveguide with pairs of first and second lateral zones.

BRIEF DESCRIPTION OF THE DRAWINGS

Other advantages and features will become more clearly apparent from the following description of particular embodiments of the present disclosure provided for exemplary purposes only and represented in the appended drawings, in which.

DETAILED DESCRIPTION

Figure 4:
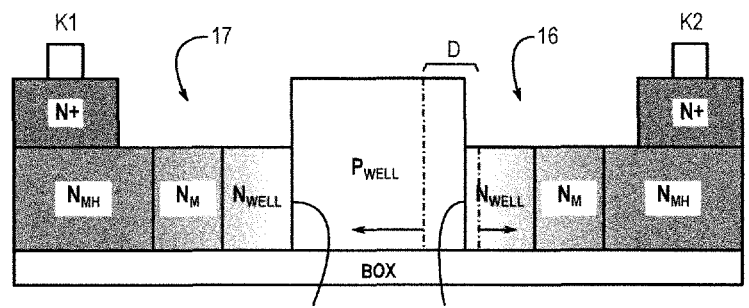
FIG. 4 is a schematic diagram of a sectional view of an embodiment of a dual-junction HSPM phase shifter, according to the present disclosure.

FIG. 4 shows a cross section, along a plane perpendicular to the axis of the optical waveguide, of an embodiment of an HSPM phase shifter comprising two P—N junctions, namely the junction 14 of the typical HSPM phase shifter and a further junction 15 configured in opposition to junction 14. The junctions are in opposition in that each of the junctions blocks a current that can flow through the other junction.

More specifically, the phase shifter comprises a central zone $P_{WELL}$ configured to be placed in the optical beam transmitted by the waveguide. This zone is weakly P-doped, for example, at the doping level of the original semiconductor substrate. The junction 14 is formed between the right lateral face of zone $P_{WELL}$ and a lateral N-doped zone 16. The (right) distal edge of zone 16 bears an electrical contact K2.

The junction 15 is formed between the left lateral face of zone $P_{WELL}$ and a lateral N-doped zone 17. The (left) distal edge of zone 17 bears an electrical contact K1. For reasons of easier manufacture, the edges of zones 16 and 17, carrying the contacts, are generally raised to be at the same level as the central zone $P_{WELL}$.

In some embodiments, the doping level of each of the lateral zones 16, 17 is minimal near the central zone and increases going towards the contacts K1 and K2. Such a gradient in the doping level may be desirable to achieve an optimal compromise between a fast response time (favored by the low resistivity achieved with a high doping level) and low optical losses in the central zone (favored by a low doping level). As in the illustrated embodiment, a doping concentration gradient may be approached stepwise, by providing several zones with different doping levels, in particular, a zone $N_{WELL}$ near the center with a minimum doping level (equivalent to the doping level of zone $P_{WELL}$), a zone $N_M$ with an intermediate doping level, a zone $N_{MH}$ with a high doping level, and an N+ zone with the highest doping level. The contacts K1 and K2 are formed on the N+ zones.

Figure 5A:
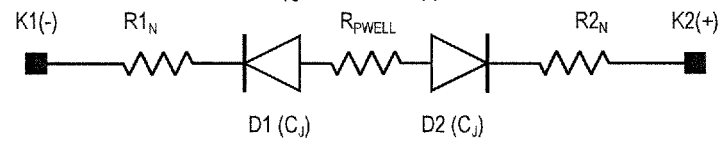
FIGS. 5A and 5B are equivalent circuit diagrams of the phase shifter of FIG. 4 in two electric control configurations of the phase shifter.

FIG. 5A illustrates an equivalent circuit diagram of the phase shifter of FIG. 4. Junctions 15 and 16 form two diodes D1 and D2 connected anode to anode. A resistor $RP_{WELL}$ between the anodes of the diodes represents the resistivity of the central zone $P_{WELL}$. Resistors $R1_N$ and $R2_N$ between, respectively, the cathodes of diodes D1, D2 and the contacts K1, K2, represent the resistivity of lateral zones 17 and 16.

FIG. 5A further illustrates an electrical configuration allowing bidirectional operation of the phase shifter. The phase shifter is symmetrical between the contacts K1 and K2, whereby the phase shifter reacts in the same manner regardless of the polarity of the voltage applied between these contacts.

The contact K1 is shown at the "minus" of the control voltage, and contact K2 at the "plus." Junction 15 could be forward biased to allow a current to flow from contact K2 to contact K1, but junction 14 would be reverse biased to prevent current flow. In practice, this type of phase shifter is designed to operate in dynamic mode, with a control voltage varying at a high frequency—the behavior of the structure of FIG. 4 may rather be considered in transient mode.

Figure 1:
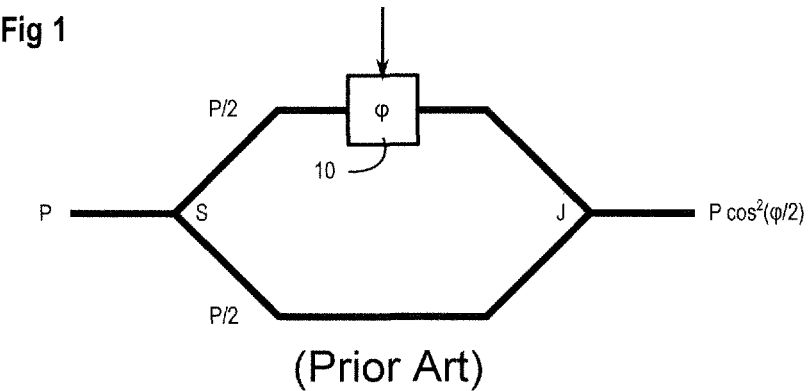
FIG. 1 is a schematic diagram of an optical modulator according to the Mach-Zehnder interferometer principle, according to the prior art.
Figure 2:
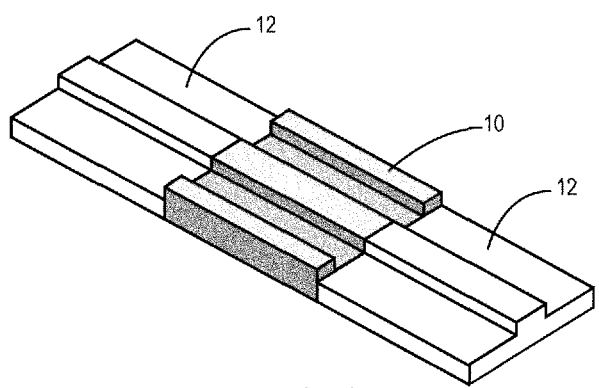
FIG. 2 is a perspective view of an electro-optical phase shifter inserted between two aligned sections of an optical waveguide, according to the prior art.
Figure 3:
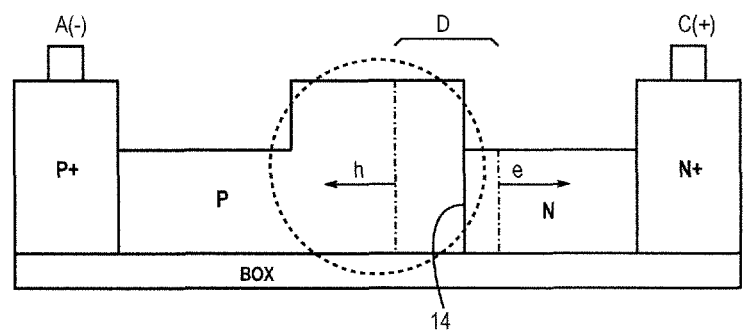
FIG. 3 is a schematic diagram of a sectional view of an HSPM phase shifter, according to the prior art.

In transient mode, junctions 14 and 15 are seen as capacitors $C_J$ having a low impedance. Thus, the capacitance of junction 15 allows the movement of holes from zone $P_{WELL}$ to the contact K1, so that a depletion region D is formed in the vicinity of junction 14. The structure then behaves in the same way as that of FIG. 3.

When the polarity between the contacts K1 and K2 is reversed, it is junction 15 that is reverse biased and the depletion region is created in the vicinity of junction 15. If the structure is symmetrical, the effect on the optical wave is the same as in the first polarity configuration.

A phase shifter is thus obtained whose phase shift depends on the absolute value of the control signal. It may be useful to have such a bidirectional component in a library to facilitate routing of the tracks for the control signals of the phase shifter. In addition, the phase shifter exhibits a capacitance equivalent to the series connection of the capacitances $C_J$ of the two junctions—the overall capacitance of the phase shifter is halved compared to a conventional phase shifter, which increases the operating frequency of the phase shifter.

Figure 5B:
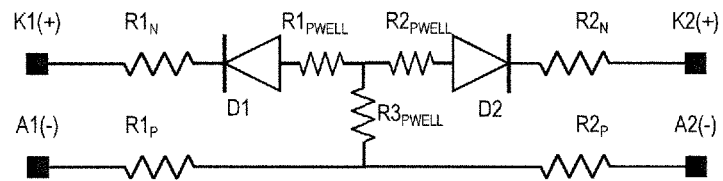

FIG. 5B shows an equivalent circuit diagram of the phase shifter of FIG. 4, in a configuration that enables increasing the sensitivity of the phase shifter. Contacts K1 and K2 both receive the "plus" of the control voltage, and additional contacts A1 and A2 are provided for bringing the "minus" of the control voltage to the central zone $P_{WELL}$. This configuration simultaneously creates two depletion regions in the vicinity of each of the two junctions 14 and 15, whereby the sensitivity of the phase shifter is doubled. This increased sensitivity is achieved without increasing the length of the phase shifter in the waveguide, i.e. without increasing the optical losses.

To maintain a symmetrical structure, the "minus" of the control voltage is applied to two contacts A1 and A2 placed on either side of the central zone $P_{WELL}$. It is considered that the contacts A1 and A2 are electrically connected to the center of the $P_{WELL}$ zone. The resistor $R_{PWELL}$ of FIG. 5A is thus distributed in FIG. 5B over two resistors $R1_{PWELL}$ and $R2_{PWELL}$. A structure for connecting the contacts A1 and A2 to the center of the zone $P_{WELL}$ has a resistance $R3_{PWELL}$ from the connection node between the resistors $R1_{PWELL}$ and $R2_{PWELL}$ and resistors R1P and R2P respectively connecting the contacts A1 and A2 to resistor $R3_{PWELL}$.

Figure 6:
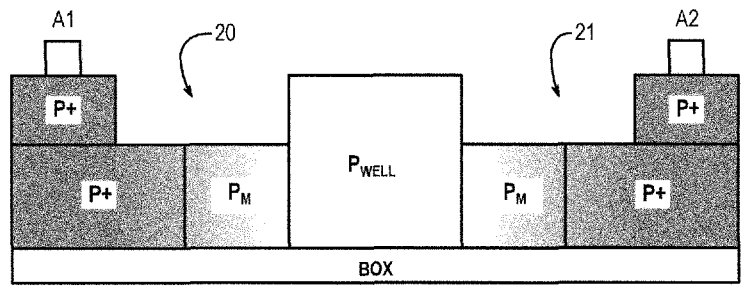
FIG. 6 is a schematic diagram of a sectional view of an exemplary structure for establishing electrical contact with the central region of the phase shifter, according to the present disclosure.

FIG. 6 is a sectional view of an example of a contact structure along a plane perpendicular to the axis of the waveguide. This contact structure is formed in a plane parallel to that of the phase shifter of FIG. 4. It comprises two lateral P-doped regions 20 and 21, respectively starting from the two lateral sides of the central zone $P_{WELL}$. The distal (left) edge of the region 20 bears contact A1. The distal (right) edge of the symmetrical region 21 bears contact A2. In some embodiments, as for the structure of FIG. 4, the doping level of each of the regions 20 and 21 follows an increasing gradient from the center to the respective contact A1, A2. This gradient is approached by zones of increasing doping levels $P_M$ and P+.

Figure 7:
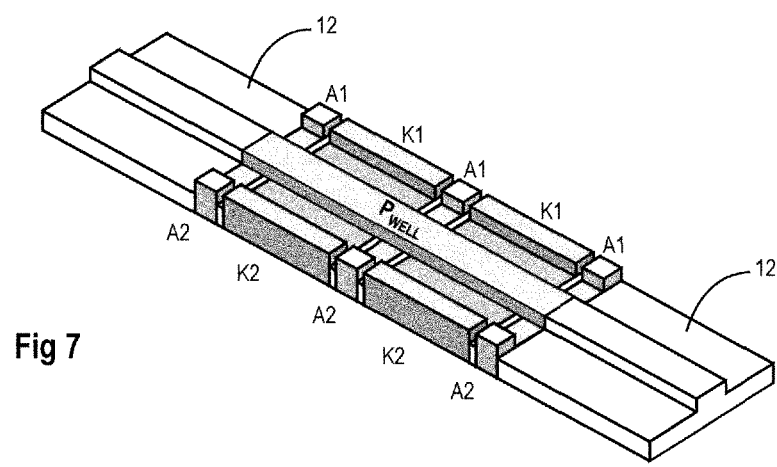
FIG. 7 is a perspective view of an electro-optical phase shifter of the type of FIGS. 4 and 6, inserted between two aligned sections of an optical waveguide.

FIG. 7 is a perspective view of an electro-optical phase shifter, combining the structures of FIGS. 4 and 6, inserted between two aligned sections of an optical waveguide. The central zone $P_{WELL}$ is a continuous beam connecting the two sections of waveguide 12. Along this beam, contact structures as that of FIG. 6, identified by the contacts A1 and A2, are interleaved with phase shifter structures as that of FIG. 4, identified by the contacts K1 and K2. The contact structures having no effect on the phase shift, but introducing optical losses, are made significantly shorter than the phase shifter structures, as shown. The number and length of the contact structures to be used are selected according to the operating frequency to be achieved, limited by the RC constants of the structures. The resistance $R3_{PWELL}$ increases with the spacing between the contact structures, and the resistances $R1_P$ and $R2_P$ increase when the contact structures are shorter.

That which is claimed is:

1. A semiconductor electro-optical phase shifter comprising:
    a optical waveguide;
    a central zone in said optical waveguide and having a first conductivity type, and first and second faces;

a structure configured to electrically couple with said central zone;

a first lateral zone adjacent the first face of said central zone and having a second conductivity type, the first face configured to form a first diode junction with said first lateral zone;

a second lateral zone adjacent the second face of said central zone and having the second conductivity type, the second face configured to form a second diode junction with said second lateral zone; and first and second terminals configured coupled respectively with said first and second lateral zones;

said structure comprising, in a plane parallel to that of the first and second lateral zones, a third lateral zone adjacent the first face of said central zone and having the first conductivity type, a fourth lateral zone adjacent the second face of the central zone and having the first conductivity type, and third and fourth terminals arranged respectively on said third and fourth lateral zones.

2. The semiconductor electro-optical phase shifter according to claim 1 wherein a dopant concentration of said central zone is at a threshold level, and dopant concentrations of each of said first and second lateral zones increase going from said central zone to respective terminals.

3. The semiconductor electro-optical phase shifter according to claim 2 wherein the threshold level comprises a minimum level.

4. The semiconductor electro-optical phase shifter according to claim 1 wherein a dopant concentration of said central zone is at a threshold level, and dopant concentrations of each of said third and fourth lateral zones increase going from said central zone towards respective terminals.

5. The semiconductor electro-optical phase shifter according to claim 4 wherein the threshold level comprises a minimum level.

6. The semiconductor electro-optical phase shifter according to claim 1 wherein said first and second lateral zones each comprises a pair thereof; and wherein said third and fourth lateral zones each comprises a pair thereof in planes interleaved along an axis of the optical waveguide with the pairs of first and second lateral zones.

7. An electro-optical phase shifter comprising:

a zone having a first conductivity type, and first and second faces;

a structure configured to electrically couple with said zone;

a first lateral zone adjacent the first face of said zone and having a second conductivity type, the first face configured to form a first diode junction with said first lateral zone;

a second lateral zone adjacent the second face of said zone and having the second conductivity type, the second face configured to form a second diode junction with said second lateral zone; and first and second terminals configured coupled respectively with said first and second lateral zones;

said structure comprising, in a plane parallel to that of the first and second lateral zones, a third lateral zone adjacent the first face of said zone and having the first conductivity type, a fourth lateral zone adjacent the second face of the zone and having the first conductivity type, and third and fourth terminals arranged respectively on said third and fourth lateral zones.

8. The electro-optical phase shifter according to claim 7 wherein a dopant concentration of said zone is at a threshold level, and dopant concentrations of each of said first and second lateral zones increase going from said zone to respective terminals.

9. A method for making an electro-optical phase shifter comprising:

forming a zone in an optical waveguide and having a first conductivity type, and first and second faces;

forming a first lateral zone adjacent the first face of the zone and having a second conductivity type, the first face to form a first diode junction with the first lateral zone;

forming a second lateral zone adjacent the second face of the zone and having the second conductivity type, the second face to form a second diode junction with the second lateral zone; and forming a structure to electrically couple with the zone, the structure comprising, in a plane parallel to that of the first and second lateral zones, a third lateral zone adjacent the first face of the zone and having the first conductivity type, a fourth lateral zone adjacent the second face of the zone and having the first conductivity type, and third and fourth terminals arranged respectively on the third and fourth lateral zones.

10. The method according to claim 9 further comprising forming first and second terminals coupled respectively with the first and second lateral zones.

11. The method according to claim 10 wherein a dopant concentration of the zone is at a threshold level, and dopant concentrations of each of the first and second lateral zones increase going from the zone to respective terminals.

* * * * *